United States Patent
Shen et al.

(10) Patent No.: US 11,025,450 B2
(45) Date of Patent: Jun. 1, 2021

(54) CABLE MEDIA CONVERTER MANAGEMENT METHOD, APPARATUS, AND SYSTEM

(71) Applicant: Huawei Technologies Co., Ltd., Shenzhen (CN)

(72) Inventors: Chenghu Shen, Dongguan (CN); Yanbin Sun, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 16/381,684

(22) Filed: Apr. 11, 2019

(65) Prior Publication Data
US 2019/0238361 A1 Aug. 1, 2019

Related U.S. Application Data

(63) Continuation of application No. PCT/CN2016/101935, filed on Oct. 12, 2016.

(51) Int. Cl.
*H04L 12/28* (2006.01)
*H04L 29/08* (2006.01)
(Continued)

(52) U.S. Cl.
CPC ...... *H04L 12/2885* (2013.01); *H04L 12/2861* (2013.01); *H04L 29/12* (2013.01); *H04L 41/0809* (2013.01); *H04L 67/34* (2013.01)

(58) Field of Classification Search
None
See application file for complete search history.

(56) References Cited

U.S. PATENT DOCUMENTS

| 7,334,258 B1* | 2/2008 | Ford | H04L 63/10 726/4 |
| 2012/0033972 A1* | 2/2012 | Dai | H04L 27/34 398/58 |

(Continued)

FOREIGN PATENT DOCUMENTS

| CN | 102739421 A | 10/2012 |
| CN | 103999380 A | 8/2014 |

(Continued)

OTHER PUBLICATIONS

Cable Television Laboratories; Data-Over-Cable Interface Specifications; Mar. 5, 2015 (Year: 2015).*

(Continued)

*Primary Examiner* — Kodzovi Acolatse
*Assistant Examiner* — The Hy Nguyen
(74) *Attorney, Agent, or Firm* — Slater Matsil, LLP

(57) ABSTRACT

A cable media converter (CMC) management method, including receiving, by a CMC controller by using a management channel, a second message packet sent by a CMC, where the second message packet has an identifier of the CMC and configuration file information of a cable modem (CM), and where the identifier of the CMC uniquely identifies the CMC, and determining, by the CMC controller according to a locally saved correspondence between an optical line terminal (OLT) and a CMC, an OLT corresponding to the CMC identified by the identifier in the second message packet, and sending the configuration file information in the second message packet to the determined OLT.

17 Claims, 4 Drawing Sheets

(51) Int. Cl.
    *H04L 29/12*     (2006.01)
    *H04L 12/24*     (2006.01)

(56) References Cited

U.S. PATENT DOCUMENTS

| | | |
|---|---|---|
| 2013/0239165 A1 | 9/2013 | Garavaglia et al. |
| 2016/0094398 A1* | 3/2016 | Choudhury ............ H04L 45/42 370/254 |
| 2017/0104680 A1 | 4/2017 | Yang et al. |
| 2018/0013615 A1* | 1/2018 | Li ........................ H04L 12/283 |

FOREIGN PATENT DOCUMENTS

| | | | |
|---|---|---|---|
| CN | 104158920 A | 11/2014 | |
| CN | 105338125 A | 2/2016 | |
| EP | 3148164 A1 | 3/2017 | |
| WO | 2015196922 A1 | 12/2015 | |
| WO | WO-2015196922 A1 * | 12/2015 | ............ H04L 45/02 |
| WO | WO-2016123739 A1 * | 8/2016 | ........... H04L 7/0008 |
| WO | 2013184834 A2 | 12/2019 | |

OTHER PUBLICATIONS

Sheng, Z. et al., "Proposed Draft New Recommendation, Cabinet DOCSIS (C-DOCSIS) System Specification," Question(s): 1, 7/9, Study Group 9—Contribution 117, Source: China, International Telecommunication Union, Telecommunication Standardization Sector, Study Period 2013-2016, XP044153826, COM9-C 117-E, 2015, 80 pages.

\* cited by examiner

CABLE MEDIA CONVERTER MANAGEMENT METHOD, APPARATUS, AND SYSTEM

CROSS-REFERENCE TO RELATED APPLICATIONS

This application is a continuation of International Application No. PCT/CN2016/101935, filed on Oct. 12, 2016, the disclosure of which is hereby incorporated by reference in its entirety.

TECHNICAL FIELD

The present disclosure relates to the communications field, and in particular, to a cable media converter (CMC) management method, an apparatus, and a system.

BACKGROUND

Data over Cable Service Interface Specification (DOCSIS) is mainly applied between a computer network and a cable television network and between a cable television head-end and a user for data packet transmission. As a main bidirectional broadband access technology used by North American and European cable operators and China Broadcast & Television, DOCSIS has been widely applied. With requirements for data services and 4K, high-definition, interactive or other video services, and requirements for cable networks in terms of operation and maintenance management and energy saving and emission reduction, it is expected that the DOCSIS technology can provide a higher access rate and support more users. In the prior art, a distributed system is provided based on DOCSIS for data transmission.

According to Distributed Converged Cable Access Platform (D-CCAP), a cable television service, an Ethernet service and other various integrated services are carried on a cable by using a digital modulation technology, so that a broadband access service with a higher rate can be provided to a cable television network user.

SUMMARY

The present disclosure provides a cable media converter management method, an apparatus, and a system, to save network resources.

According to a first aspect, an embodiment of the present disclosure provides a cable media converter CMC management method, including receiving, by a CMC controller by using a management channel, a second message packet sent by a CMC, where the second message packet includes an identifier of the CMC and configuration file information of a CM, the identifier of the CMC is used to uniquely identify the CMC, and the CM is connected to the CMC by using a cable, and finding, by the CMC controller based on a locally saved correspondence between an optical line terminal (OLT) and a CMC, an OLT corresponding to the CMC identified by the identifier, and sending the configuration file information in the second message packet to the determined OLT.

With reference to the first aspect, in a first possible implementation, the OLT is in a one-to-one correspondence with the CMC, and the CMC controller is connected to a plurality of OLTs.

With reference to the first aspect or the first possible implementation, in a second possible implementation, the method includes obtaining, by the CMC controller in advance from each of all the OLTs connected to the CMC controller, information about a CMC connected to the OLT, to form a correspondence between the CMC and the OLT.

According to a second aspect, an embodiment of the present disclosure provides a cable media converter CMC controller, where the CMC controller includes a sending module, a processing module, a receiving module, and a saving module, where the receiving module is configured to receive a message packet sent by a CMC, where the message packet includes an identifier of the CMC and configuration file information of a CM, and the identifier of the CMC is used to uniquely identify the CMC, the saving module is configured to save a correspondence between an OLT and a CMC, the processing module is configured to determine, based on the correspondence between an OLT and a CMC that is saved by the saving module, an OLT corresponding to the CMC identified by the identifier in the message packet received by the receiving module, and the sending module is configured to send the configuration file information of the CM in the message packet to the determined OLT.

With reference to the second aspect, in a first possible implementation, the OLT is in a one-to-one correspondence with the CMC, and the CMC controller is connected to a plurality of OLTs.

With reference to the second aspect or the first possible implementation, in a second possible implementation, the saving module obtains, in advance from each of all the OLTs connected to the CMC controller, information about a CMC connected to the OLT, to form a correspondence between the CMC and the OLT.

According to a third aspect, an embodiment of the present disclosure provides a cable network system, where the system includes a plurality of OLT devices, a plurality of cable media converters CMCs, a plurality of cable modems CMs, and at least one cable media converter CMC controller, where each OLT device is connected to a CMC by using an optical fiber, each CMC is connected to a CM by using a cable, and the CMC controller is connected to at least two OLT devices, and the CMC controller is the foregoing CMC controller.

By using the solutions in the embodiments, the CMC controller can find the corresponding OLT based on the CMC identifier in the received packet, and then send the configuration file to the corresponding OLT for configuration. In this way, CMCs corresponding to a plurality of OLTs can be managed by using one CMC controller, thereby implementing device sharing and reducing network hardware costs.

BRIEF DESCRIPTION OF THE DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may derive other drawings from these accompanying drawings without creative efforts.

DETAILED DESCRIPTION OF ILLUSTRATIVE EMBODIMENTS

To make the objectives, technical solutions, and advantages of embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding, first, an example diagram of a network architecture that can implement a communication method according to the embodiments of the present disclosure is described on the whole. It should be understood that, the embodiments of the present disclosure are not limited to being applied to a D-CCAP network architecture shown in FIG. 1. In addition, an apparatus in FIG. 1 may be hardware, or software divided based on functions, or a combination thereof.

Figure 1:
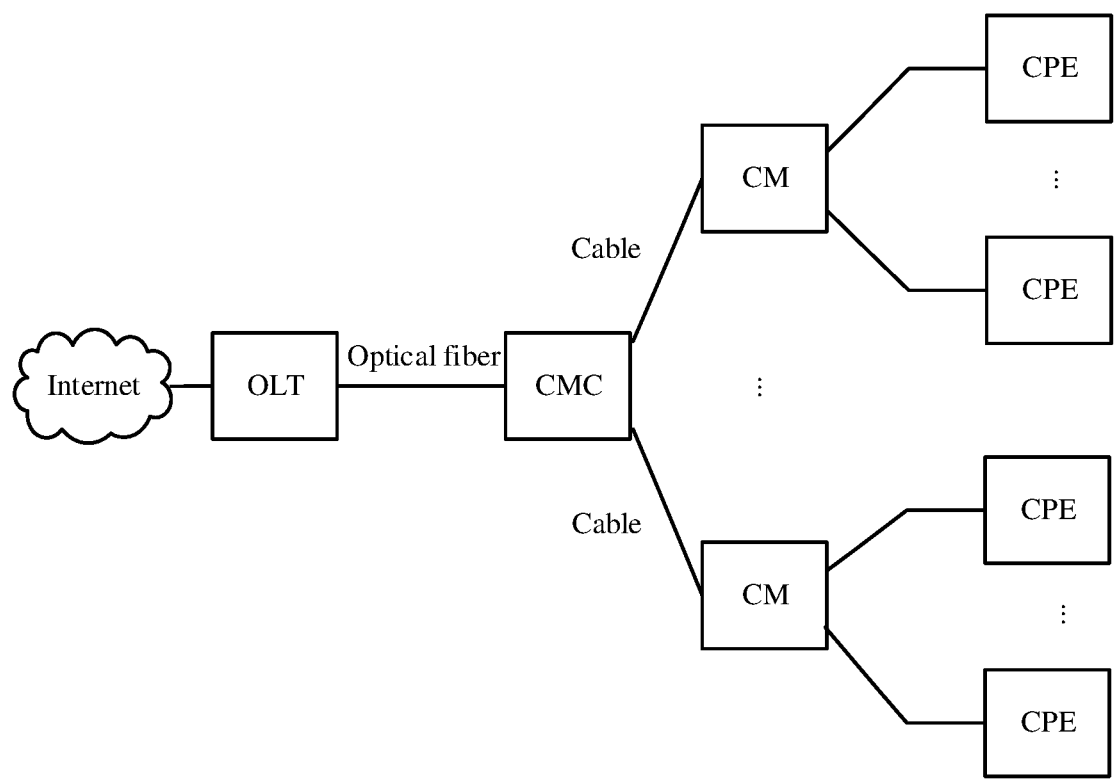
FIG. 1 is a schematic architectural diagram of a D-CCAP system.

The D-CCAP network architecture shown in FIG. 1 includes an optical line terminal (OLT), a cable media converter CMC, a cable modem (CM), and a customer premises equipment (CPE). A direction from the OLT to the CPE is referred to as a downlink direction, and a direction from the CPE to the OLT is referred to as an uplink direction.

The OLT is configured to connect a hybrid fiber coaxial (HFC) network to an upper-layer network (for example, the Internet). In the downlink direction, the OLT converts data from the upper-layer network into an optical signal for transmission on an optical fiber, and in the uplink direction, an optical signal is terminated at the OLT, and the OLT converts the optical signal into data and transmits the data to the upper-layer network.

The CMC is configured to implement a function of converting an optical signal into an electrical signal and a function of converting a digital signal into an analog signal.

The CM is mainly used in a cable television network for data transmission. The CM is connected in series between a cable television cable socket and a network access device (for example, the CPE in FIG. 1) in a house of a user. Another end that connects to the CM by using the cable television network is a cable television broadcast station. The another end may be referred to as a head-end. The CM modulates uplink data to be uploaded by a user and then transmits the uplink data to the Internet and the like, and demodulates downlink data from the Internet and the like and then transmits the downlink data to the network access device.

The CPE is also referred to as a customer premises equipment CPE, for example, a tablet computer, a personal computer, a fixed-line phone or another network access device.

A common service procedure in a D-CCAP network is a service signal (including an electrical signal such as various interactive videos, and data and voice services) from a network side is first converted into an optical signal in an OLT and transmitted on an optical fiber, after reaching a CMC, the optical signal is converted by the CMC into an electrical signal, and is sent to a user end by using a cable, after reaching the user end, the electrical signal is demodulated by a CM, and is finally sent to each CPE.

In the D-CCAP network, the CMC manages the CM, and the OLT manages the CMC. A CMC controller is disposed in the OLT to implement management on the CMC.

An example of a layer 2 virtual private network (L2VPN) service is used for description below. An L2VPN configuration file is downloaded by the CM from a Trivial File Transfer Protocol (TFTP) server, and then uploaded to the CMC. The CMC obtains the L2VPN configuration file sent by the CM, and then transfers the configuration file to the CMC controller in the OLT. The OLT performs VPN configuration based on the L2VPN configuration file received by the CMC controller, to implement an L2VPN service requested by the CM.

However, in a conventional solution, a CMC controller is integrated in an OLT, and one CMC controller is configured in one OLT. As a result, when there are many OLTs in a network, many CMC controllers are configured, leading to a waste of resources. In addition, because each time a CMC controller communicates with a CMC, conversion will be performed according to an internal communication protocol between the CMC controller and an OLT and an external communication protocol between the OLT and the CMC, a process is relatively complex. This conversion process easily causes incompatibility between an OLT and a CMC that are from different vendors. To resolve the foregoing problem of a waste of resources, in the present disclosure, a new D-CCAP architecture or processing method is described by using different embodiments.

Figure 2:
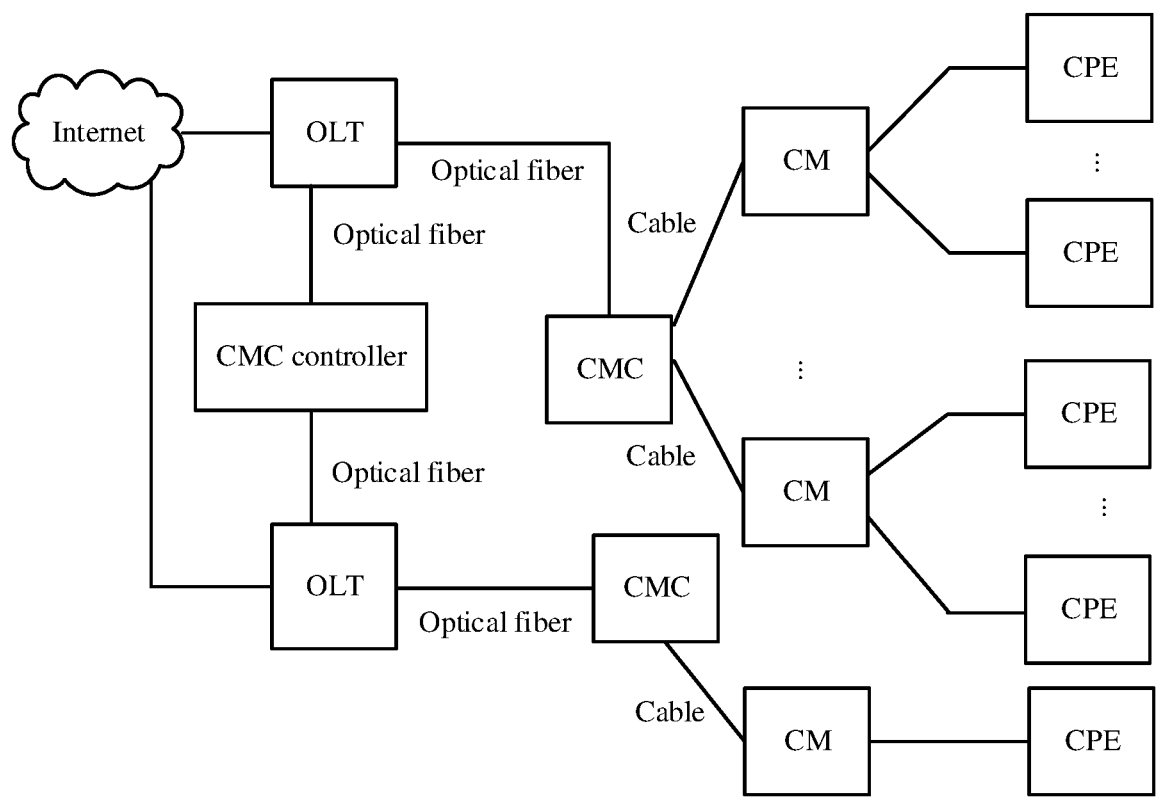
FIG. 2 is a schematic architectural diagram of a D-CCAP system according to an embodiment of the present disclosure.

An embodiment of the present disclosure provides a new cable network architecture. As shown in FIG. 2, with respect to the architecture shown in FIG. 1, in the new architecture, a CMC controller is an independent device, and one CMC controller may be connected to a plurality of OLTs to manage a plurality of CMCs by using a management channel. The plurality of CMCs respectively correspond to different OLTs. The CMC controller may be connected to the OLT by using an optical fiber or another type of wire. It should be noted that quantities of OLTs and CMCs in FIG. 1 are not intended to limit the present disclosure.

To implement management on the plurality of CMCs, a correspondence between a CMC and an OLT needs to be maintained on the CMC controller. In this way, after a CMC obtains a configuration file sent by a CM managed by the CMC, the CMC adds a unique identifier of the CMC to the configuration file, and sends the configuration file to the CMC controller by using the management channel. The CMC controller then forwards the configuration file to a corresponding OLT based on the correspondence between a CMC and an OLT. The corresponding OLT performs configuration after receiving the configuration file.

Figure 3:
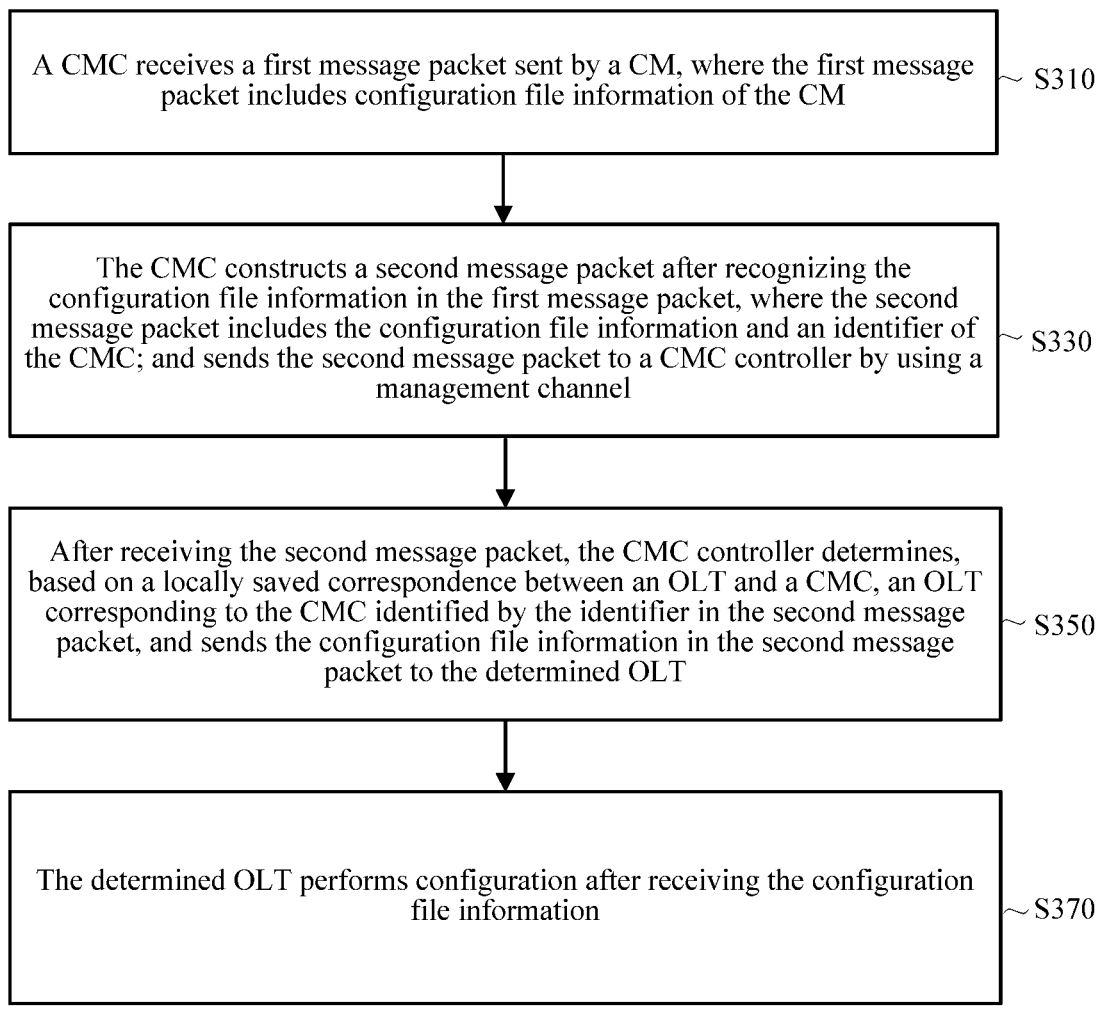
FIG. 3 is a schematic flowchart of a CMC management method according to an embodiment of the present disclosure.

A schematic flowchart of a CMC management method according to an embodiment of the present disclosure is shown in FIG. 3. It should be understood that, although steps or operations of the method are shown in FIG. 3, the steps or operations are only examples, and other operations or variations of the operations in FIG. 3 may also be performed in this embodiment of the present disclosure. Furthermore, the steps in FIG. 3 may be performed in a sequence different from that presented in FIG. 3, and some operations in FIG. 3 may not need to be performed.

S310. A CMC receives a first message packet sent by a CM, where the first message packet includes configuration file information of the CM.

Specifically, the first message packet conforms to a protocol message format such as NetConf/RestConf. The configuration file information of the CM is configuration information of a parameter required when the CM comes online.

S330. The CMC constructs a second message packet after recognizing the configuration file information in the first message packet, where the second message packet includes the configuration file information and an identifier of the CMC, and sends the second message packet to a CMC controller by using a management channel.

The identifier of the CMC is used to uniquely identify the CMC.

The management channel between the CMC and the CMC controller runs through the OLT, and a management message is transparently transmitted in the OLT. In addition, the CMC controller cannot directly know an OLT from which the management message is transparently transmitted.

In an embodiment, the identifier of the CMC may be a MAC address of the CMC, or another identifier that can uniquely identify the CMC.

In an embodiment, that the CMC constructs a second message packet after recognizing the configuration file information in the first message packet includes the CMC parses the received first message packet, and then constructs a packet according to a communication protocol of the management channel between the CMC and the CMC controller, and adds the identifier of the CMC to the constructed packet.

S350. After receiving the second message packet, the CMC controller determines, based on a locally saved correspondence (that is, a connection relationship) between an OLT and a CMC, an OLT corresponding to the CMC identified by the identifier in the second message packet, and sends the configuration file information in the second message packet to the determined OLT.

The CMC is in a one-to-one correspondence with the OLT, and the CMC controller is in a one-to-many correspondence with OLTs. Usually, the correspondence between a CMC and an OLT is saved in a form of a table in the CMC controller. The table shows that different CMCs respectively correspond to different OLTs, so that the CMC controller can find the corresponding OLT based on the identifier of the CMC in the second message packet to perform control. A person of ordinary skill in the art should understand that, the table is only a form of expression of the correspondence and is not intended to limit this embodiment of the present disclosure. The correspondence may alternatively be saved in another form.

Further, the method further includes S370, where the determined OLT performs adaptive configuration after receiving the configuration file information. In this way, a data path between a CM and an OLT can be established, to implement uplink/downlink service data transmission between the CM and the OLT.

Furthermore, before step S350, the CMC controller obtains, from each of all the OLTs connected to the CMC controller, information about a CMC connected to the OLT, to form a correspondence between the CMC and the OLT, and saves the correspondence.

According to this embodiment of the present disclosure, the CMC controller is disposed outside the OLT and is connected to a plurality of OLTs. Because the table of the correspondence between a CMC and an OLT is saved in the CMC controller, after obtaining the configuration file of the CM managed by the CMC, the CMC adds the identifier of the CMC to the packet used for sending the configuration file to the CMC controller. In this way, the CMC controller can find a corresponding OLT based on the identifier of the CMC in the received packet, and then sends the configuration file to the corresponding OLT for configuration. In this way, CMCs corresponding to a plurality of OLTs can be managed by using one CMC controller, thereby implementing device sharing and reducing network hardware costs.

Figure 4:
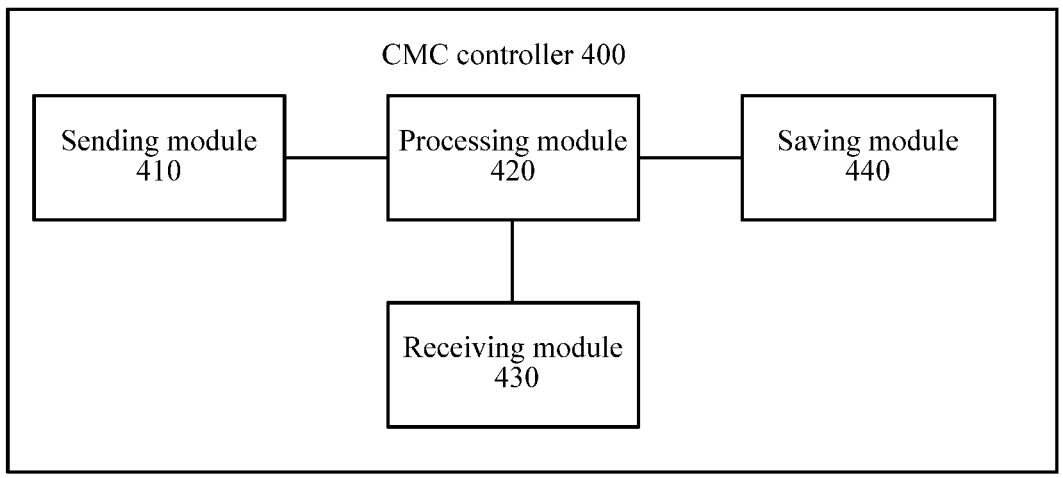
FIG. 4 is a schematic structural diagram of a CMC controller according to an embodiment of the present disclosure.

An embodiment of the present disclosure provides a CMC controller. As shown in FIG. 4, the CMC controller 400 includes a sending module 410, a processing module 420, a receiving module 430, and a saving module 440.

The receiving module 430 is configured to receive a message packet sent by a CMC, where the message packet includes an identifier of the CMC and configuration file information of a CM, and the identifier of the CMC is used to uniquely identify the CMC, the CM is connected to the CMC by using a cable.

The saving module 440 is configured to save a correspondence between an OLT and a CMC. A CMC is in a one-to-one correspondence with an OLT.

The processing module 420 is configured to determine, based on the correspondence between an OLT and a CMC that is saved by the saving module 440, an OLT corresponding to the CMC identified by the identifier in the message packet received by the receiving module 430.

The sending module 410 is configured to send the configuration file information of the CM in the message packet to the determined OLT.

The processing module 420 may be a processor or a controller, or may be a general-purpose processor, a digital signal processor (DSP), an application-specific integrated circuit (ASIC), a field programmable gate array (FPGA) or another programmable logic device, a transistor logic device, a hardware component, or a combination thereof. The processing module 420 may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The receiving module 430 and the sending module 410 may be respectively a receive interface part and a sending interface part of a transceiver, or may be respectively a receive interface part and a sending interface part of a transceiver circuit. The saving module 440 may be any medium that can store program code, such as a USB flash drive, a removable hard disk, a read-only memory (ROM), a random access memory (RAM), a magnetic disk or an optical disc.

Figure 5:
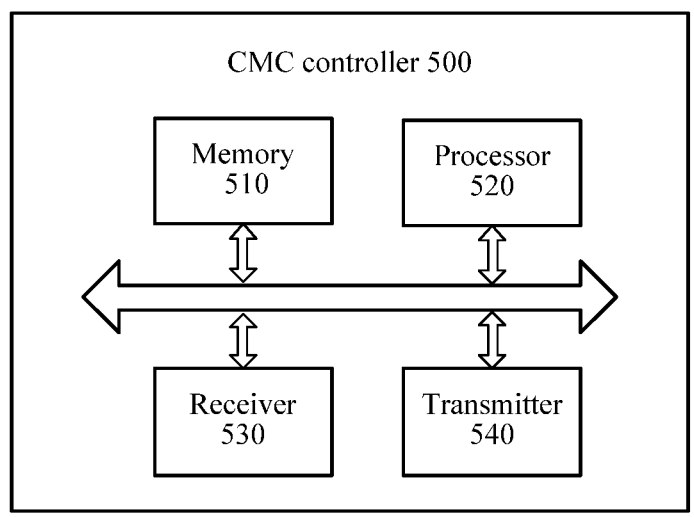
FIG. 5 is a schematic structural diagram of a CMC controller according to another embodiment of the present disclosure.

FIG. 5 is a schematic structural diagram of a CMC controller 500 according to another embodiment of the present disclosure. The CMC controller 500 includes a memory 510, a processor 520, a receiver 530, and a transmitter 540.

The memory 510 is configured to store a program.

The processor 520 is configured to execute the program stored in the memory 510.

When executing the program stored in the memory 510, the processor 520 is configured to invoke the receiver 530 to receive a message packet from a CMC. The message packet includes an identifier of the CMC and configuration file information of a CM. The CM is connected to the CMC by using a cable.

The memory 510 is further configured to save a correspondence between an OLT and a CMC. A CMC is in a one-to-one correspondence with an OLT.

The processor 520 is further configured to determine, based on the correspondence between an OLT and a CMC that is saved by the memory 510, an OLT corresponding to the CMC identified by the identifier in the message packet received by the receiver 530, and invoke the transmitter 540 to send the configuration file information of the CM in the message packet to the determined OLT.

For descriptions of functions of the modules in this embodiment, refer to all related content of the steps in the foregoing method embodiments, and details are not described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
receiving, by a cable media converter (CMC) controller using a management channel, a second message packet sent by a CMC, wherein the second message packet comprises an identifier of the CMC and configuration file information of a cable modem (CM), and wherein the identifier of the CMC uniquely identifies the CMC; and
determining, by the CMC controller according to a locally saved correspondence between an optical line terminal (OLT) and the CMC, the OLT corresponding to the CMC identified by the identifier of the CMC in the second message packet;
sending, by the CMC controller, the configuration file information of the CM in the second message packet to the determined OLT; and
obtaining, by the CMC controller in advance from each of a plurality of OLTs that are connected to the CMC controller, information about a corresponding CMC connected to the each of the plurality of OLTs, to form a correspondence between the corresponding CMC and the each of the plurality of OLTs.

2. The method according to claim 1, wherein the OLT is in a one-to-one correspondence with the CMC, and the CMC controller is connected to the plurality of OLTs.

3. The method according to claim 1, wherein the configuration file information of the CM is received by the CMC from a first message packet sent by the CM.

4. The method according to claim 1, wherein the identifier of the CMC is added by the CMC to the configuration file information of the CM before the second message packet is received by the CMC controller.

5. The method of claim 1, wherein the configuration file information of the CM comprises information of a parameter when the CM comes online.

6. The method according to claim 1, wherein the determined OLT performs adaptive configuration after the determined OLT receives the configuration file information.

7. A cable media converter (CMC) controller, comprising:
at least one processor;
a transmitter;
a receiver; and
a non-transitory computer readable storage medium storing processor-executable program to be executed by the at least one processor, the processor-executable program including instructions for:
receiving a second message packet sent by a CMC using a management channel, wherein the second message packet comprises an identifier of the CMC and configuration file information of a cable modem (CM), and the identifier of the CMC uniquely identifies the CMC;

determining, according to a locally saved correspondence between an optical line terminal (OLT) and the CMC, the OLT corresponding to the CMC identified by the identifier of the CMC in the second message packet;

sending the configuration file information of the CM in the second message packet to the determined OLT; and obtaining in advance from each of a plurality of OLTs connected to the CMC controller, information about a corresponding CMC connected to the each of the plurality of OLTs, to form a correspondence between the corresponding CMC and the each of the plurality of OLTs.

8. The CMC controller according to claim 7, wherein the OLT is in a one-to-one correspondence with the CMC, and the CMC controller is connected to the plurality of OLTs.

9. The CMC controller according to claim 7, wherein the configuration file information of the CM is received by the CMC from a first message packet sent by the CM.

10. The CMC controller according to claim 7, wherein the identifier of the CMC is added by the CMC to the configuration file information of the CM before the second message packet is received by the CMC controller.

11. The CMC controller of claim 7, wherein the configuration file information of the CM comprises information of a parameter when the CM comes online.

12. The CMC controller according to claim 7, wherein the determined OLT performs adaptive configuration after the determined OLT receives the configuration file information.

13. A cable network system, comprising:
a plurality of optical line terminals (OLTs);
a plurality of cable media converters (CMCs);
a plurality of cable modems (CMs); and
a CMC controller;
wherein each OLT of the plurality of OLTs is connected to a corresponding CMC of the plurality of CMCs by an optical fiber, wherein each CMC of the plurality of CMCs is connected to a corresponding CM by using a cable, and wherein the CMC controller is connected to the plurality of OLT; and wherein the CMC controller is configured to:
receive a second message packet sent by a CMC of the plurality of cable media converters (CMCs) using a management channel, wherein the second message packet comprises an identifier of the CMC and configuration file information of a CM of the plurality of CMs, and the identifier of the CMC uniquely identifies the CMC;

determine, according to a locally saved correspondence between an OLT of the plurality of OLTs and the CMC, the OLT corresponding to the CMC identified by the identifier of the CMC in the second message packet;

send the configuration file information of the CM in the second message packet to the determined OLT; and obtain in advance from the each of the plurality of OLTs connected to the CMC controller, information about the corresponding CMC connected to the each of the plurality of OLTs, to form a correspondence between the corresponding CMC and the each of the plurality of OLTs.

14. The cable network system according to claim 13, wherein the OLT is in a one-to-one correspondence with the CMC, and the CMC controller is connected to the plurality of OLTs.

15. The CMC controller according to claim 13, wherein the configuration file information of the CM is received by the CMC from a first message packet sent by the CM.

16. The CMC controller according to claim 13, wherein the identifier of the CMC is added by the CMC to the configuration file information of the CM before the second message packet is received by the CMC controller.

17. The CMC controller of claim 13, wherein the configuration file information of the CM comprises information of a parameter when the CM comes online.

* * * * *